UNITED STATES PATENT OFFICE.

EMIL POLLACSEK, OF SPEZIA, ITALY.

BINDING AND IMPREGNATING MATERIALS MADE FROM WASTE SULFITE LIQUORS.

1,133,499. Specification of Letters Patent. Patented Mar. 30, 1915.

No Drawing. Application filed September 10, 1913. Serial No. 789,145.

*To all whom it may concern:*

Be it known that I, EMIL POLLACSEK, subject of the King of Hungary, residing at Spezia, Italy, have invented certain new and useful Improvements in and Relating to Binding and Impregnating Materials Made from Waste Sulfite Liquors; and I do hereby declare the following to be a full, clear, and exact description of the invention, such as will enable others skilled in the art to which it appertains to make and use the same.

As is well known, it has been several times proposed to utilize waste sulfite liquors for the manufacture of glues or binding substances, by evaporating the liquors with the addition of lime. Satisfactory results have not however been so far obtained from these proposals for the following reasons:

1. The liquors contain free acid which corrodes the evaporating vessels. If liquor mixed with lime is being evaporated, a froth is formed after the liquid has reached a certain concentration, and the mass cakes and adheres to the walls of the vessel.

2. On account of the adhesion of the solidified mass to the walls of the vessel, the removal of the mass requires a great deal of time and labor and cannot be effected without loss of material.

3. The sticky nature of the finished product renders it very difficult to pack same for the purpose of sending it to the place of consumption.

4. Although the product seems hard and brittle immediately on being obtained, it soon becomes tough and sticky again as it energetically absorbs moisture from the air. This greatly increases the difficulty of mixing it with large masses of pulverulent or fine-grained substances, for the agglomeration of which the product is intended.

5. The drawbacks above referred to result in frequent stoppages of the apparatus for the manufacture or treatment of the glue or binding substance.

6. The binding substance hitherto known, made from sulfite liquor, are soluble in water.

The object of the present process is to manufacture from sulfite liquor a binding and impregnating substance insoluble in water, and, at the same time, to avoid the difficulties arising in its manufacture and treatment. In this process lime and mineral oil are added to the sulfite liquor.

According to this invention, the excess of lime added to the liquor, is removed during the evaporation by means of rock oil distillate deprived of benzin. The concentration of the liquor which has become a thick fluid is then continued, and more heavy oil is added in a hot state, whereupon the whole mass is allowed to cool. The mass is now mixed again with heavy oil, lime paste is added and the whole boiled. The process is carried out in the following manner: The liquor is mixed with a slight excess of lime and evaporated until froth is formed. A heavy rock oil distillate is then introduced drop by drop, the result being that the oil distillate envelops the calcium compounds which are being formed. The mixture of oil and calcium salts can now be removed from the surface of the liquid and decomposed into its ingredients in order to recover the oil. The liquid deprived of its excess of lime is then evaporated until a sample taken appears just sufficiently liquid to flow off from a stirring rod without solidifying. At this stage about 5% of heavy oil is added to the hot thick-fluid liquor and the whole is thoroughly mixed. This treatment does not diminish or impair the adhesive power of the product. For the purpose of rendering the product insoluble in water a further quantity of oil is added until the mass consists of about 5 parts of oil to 4 parts of the product. This mass is now mixed with 1.5 parts of slaked lime paste and thereafter boiled.

The product manufactured in the manner described, represents a binding medium for pulverulent or fine-grained substances which are insoluble in water, or an impregnating substance for timber, hemp cables or the like. The said product may be used in various proportions and mixed with hydrate of calcium, crude oil deprived of benzin, and water, according to the nature of the materials to be agglomerated or impregnated, as will be explained by the following examples in which the said product is referred to as the main binding substance.

(A) For impregnating wood of various kinds, hemp cables or the like, the same are first deprived of water to the greatest possible extent and thereafterward treated with the impregnating medium in a more or less fluid and hot condition. When the articles under treatment are saturated with the impregnating medium, which condition can be ascertained by the cessation of air bubbles appearing on the surface of the liquid, the impregnated articles are dried in a moderately warm current of air. The impregnating medium is preferably made of 50 parts by weight of solid main binding substance, 50 parts by weight of crude oil deprived of benzin, and 15-20 parts by weight of hydrate of calcium, which mixture is thoroughly mixed with such a quantity of water and heated with access of air for such a time that the liquid shows a density of 20-25° Baumé.

(B) In order to agglomerate iron ore or blast furnace dust with scrap iron, for each 100 parts of the material, 5-7 parts of solid main binding substance and 3-4 parts of hydrate of calcium are used together with as much water as is required in order to impregnate the mass and render same plastic.

(C) For forming coal briquets from coal dust, for each 100 parts of the material, 4-5 parts of solid main binding substance, 5 parts of crude oil deprived of benzin and 2 parts of burnt lime or a correspondingly greater quantity of hydrate of calcium are used. The addition of water is calculated so that the binding mixture should have a density of 32-35° Baumé.

(D) For manufacturing an insulating or paving material from pulverulent or fine-grained substances, a binding mixture is used consisting of 5-10 parts of the solid main binding substance for 100 parts of the pulverulent or fine-grained substance, together with 1-6 parts crude oil and 8-15 parts hydrate of calcium.

Claims:

1. A process for the manufacture of a binding and impregnating medium from waste sulfite liquors, lime and mineral oil, which comprises adding lime to the sulfite liquor, heating the mixture to the frothing stage, adding a heavy rock oil distillate, removing the oily mixture containing the calcium compounds, continuing the concentration of the remaining liquor, adding an additional quantity of rock oil distillate to the thickened concentrate, cooling, adding lime paste and more oil to the concentrate, and finally boiling the mixture.

2. A step in the process of manufacturing a binding agent from waste sulfite lye, which comprises adding mineral oil to a lime-sulfite liquor mixture at the frothing period and separating the resulting mixture of oil and excess of lime.

In testimony that I claim the foregoing as my invention, I have signed my name in presence of two subscribing witnesses.

EMIL POLLACSEK.

Witnesses:
ANGELO DORAQUIA,
C. A. FERRAR.